June 20, 1933.  W. W. FERRIS  1,914,971
EYEGLASS STRUCTURE
Filed Sept. 4, 1929
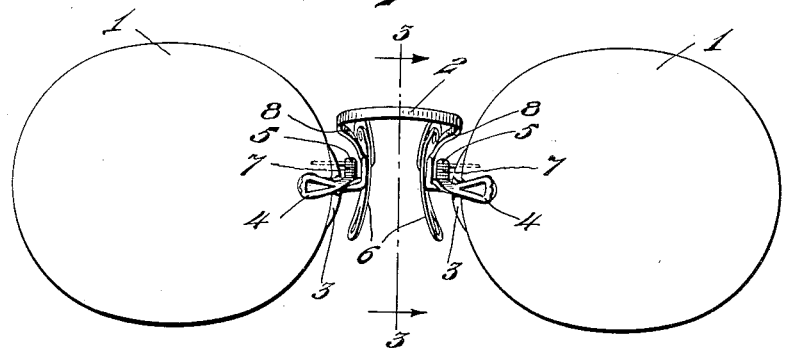
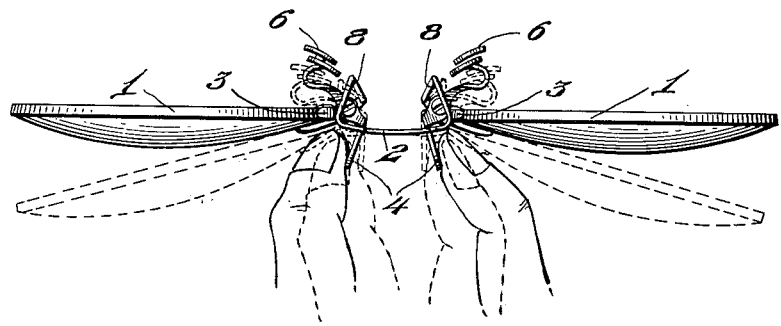
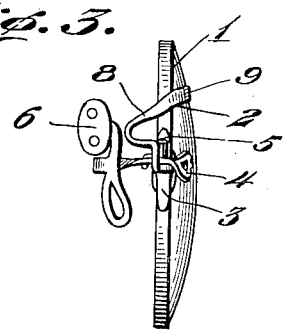
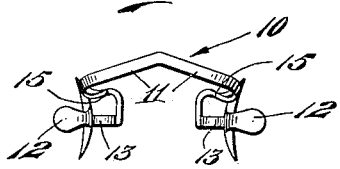
Inventor
William W. Ferris
By Perley H. Plant
Attorney Patented June 20, 1933

1,914,971

UNITED STATES PATENT OFFICE

WILLIAM W. FERRIS, OF PROVIDENCE, RHODE ISLAND

EYEGLASS STRUCTURE

Application filed September 4, 1929. Serial No. 390,237.

This invention relates to an improved eyeglass structure and more particularly a structure of this character provided with an improved resilient connecting member for connecting the lenses which is capable of flexing to permit movement of the lenses out of their normal plane in attaching or removing the eyeglass structure from the nose of the wearer.

One object of the invention is to provide a triple tension means for supporting eyeglasses of this character from the nose of the wearer comprising a flexible connecting member connecting the lenses and post spring means located adjacent to the opposite ends of the flexible connecting member for resiliently pressing the usual guards against the nose of the wearer, whereby the flexible connecting member and post spring means will tend to act as compensating means to equalize and modify the tension effect and exert a lighter gripping action on the nose without rendering the glasses unduly liable to accidental removal.

Another object of the invention is the provision of a device of this character wherein the combined spring means act as a cushioning means for preventing or reducing breakage of the lenses or the connections therewith when struck or dropped, the resiliency of the connecting member acting as a cushion to absorb shocks to which the lenses may be subjected.

A further object of the invention is the provision of a resilient connecting member permitting the lenses to be turned somewhat out of their normal plane to facilitate their application to or removal from the nose of the wearer.

Other objects and advantages of the invention relate to various improved details of construction and novel arrangements of the parts as will be more fully set forth in the detailed description to follow.

Referring to the drawing:

Fig. 1 is a front elevational view of the eyeglass structure,

Fig. 2 is a top plan view of the structure, shown in Fig. 1, illustrating in full lines the position of the parts when the finger grips are engaged by the fingers of the wearer to turn the nose guards into open position, and showing in dotted lines the position of the parts as the flexible connecting member is flexed to turn the lenses out of their normal planes, Fig. 3 is a vertical sectional view, taken substantially along the line 3—3 of Fig. 1, and, Fig. 4 is a front elevational view of a slightly modified form of connecting member.

In the embodiment of the invention illustrated herewith 1 designates the lenses of an eyeglass structure which may be provided with rims or may be of the rimless type as shown, and which are shown as connected to the opposite ends of a connecting member 2 by being secured in straps 3 formed integral with or secured to opposite ends of the connecting member 2.

Finger grips 4 are pivotally mounted on posts 5 carried by the connecting member 2 and are preferably provided with nose guards 6 of any suitable form for gripping opposite sides of the nose of the wearer under the influence of the pressure exerted by coiled springs 7 carried by the posts 5 and which springs are arranged to engage the pivotally mounted finger grips for forcing the nose guards towards each other.

The connecting member 2 is provided with curved portions 8 located adjacent the ends thereof for increasing the flexibility of the connecting member, and the central portion of the connecting member is flattened as at 9 in a direction substantially parallel with the plane of the lenses to permit the connecting member to flex more freely so as to permit movement of the lenses out of their normal plane into positions so that the planes of the lenses if extended will form an obtuse angle with each other, or in other words to permit movement of the lenses in a direction substantially at right angles to their normal plane as indicated in Fig. 2 of the drawing.

In the form of the invention illustrated in Fig. 4 of the drawing the integral connecting member 10 is provided with a central section made up of angular portions 11, each of which are flattened as in the form previously shown to permit the connecting member to flex somewhat freely intermediate the ends thereof whereby lenses secured in the straps 12 carried by opposite ends of the connecting member may move out of their normal planes after the manner illustrated in Fig. 2 of the drawing.

The finger grips, and posts for supporting the same, as well as the coiled springs carried by the posts are omitted from the structure as shown in Fig. 4 of the drawing in order to more fully disclose the connecting member structure, but these parts are to be included in this form of the device, the parts being adapted to be located at the points designated by the reference character 13. Portions of the connecting member 10 are bent to form reentrant curves adjacent to the ends thereof as indicated at 15 to increase the flexibility of the connecting member.

It will be seen from the above that I have provided a combination of spring means adapted for use in eyeglass structures of the type which are adapted to be resiliently secured to the nose of the wearer, wherein the usual post springs are supplemented by a resilient form of connecting member which is adapted to flex in such a direction as to supplement the resilient effect of the post springs, and produce a structure in which the lenses are substantially cushioned, and injury thereto or to the straps connecting the lenses with the connecting member largely eliminated. The provision of the flexible connecting member taken together with the usual post springs and nose guards also provides a wider range of adjustment for the nose guards than is the case with devices of this character as heretofore made, and causes the guards to resiliently adapt themselves for engagement with the nose of the wearer under varying conditions of use.

While I have shown and described one form which my invention may assume in practice it is to be understood that various changes and modifications may be made in the structure as shown and described without departing from the spirit and scope of my invention or the claims appended hereto, which claims are to be broadly construed in the light of my disclosure.

What I claim is:—

1. An eyeglass structure comprising a pair of lenses, a resilient member connecting said lenses and resiliently effective in a plane located at substantially right angles to the plane of the lenses, and spring pressed finger grips carried by said connecting member and resiliently effective independently of and in supplemental relation to the resiliency of said connecting member for holding the eyeglass structure upon the nose of the wearer.

2. An eyeglass structure comprising a pair of lenses, a member connecting said lenses and provided with a flattened resilient portion located substantially centrally of the lenses, a pair of finger grips mounted upon portions of the connecting member located outwardly of the central resilient portion thereof and separate spring members engaging said finger grips and resiliently effective independently of and in supplemental relation with the resilient portion of said connecting member for holding the eyeglass structure upon the nose of the wearer.

3. An eyeglass structure comprising a pair of lenses, a member connecting said lenses and having end portions connected to the lenses and intermediate resilient angular portions meeting substantially centrally of the lenses and resiliently effective in a plane at substantially right angles to the plane of the lenses whereby upon changing the meeting angle of said angular portions the lenses may be adjusted longitudinally of a line joining their centers, and a spring pressed finger grip pivotally mounted upon said connecting member between each angular portion and the adjacent lens and resiliently effective independently of and in supplemental relation with the resiliency of said connecting member for holding the eyeglass structure upon the nose of the wearer.

In testimony whereof I have affixed my signature.

WILLIAM W. FERRIS.